Dec. 14, 1965    L. REISNECKER    3,223,869
COMMUTATOR FOR AN ELECTRIC MOTOR
Filed Feb. 12, 1962

INVENTOR
Ludwig Reisnecker
by Michael S. Striker
Attorney

United States Patent Office 3,223,869
Patented Dec. 14, 1965

3,223,869
COMMUTATOR FOR AN ELECTRIC MOTOR
Ludwig Reisnecker, Stuttgart-Botnang, Germany, assignor to Robert Bosch G.m.b.H., Stuttgart, Germany
Filed Feb. 12, 1962, Ser. No. 172,502
Claims priority, application Germany, Apr. 28, 1961,
B 62,313
9 Claims. (Cl. 310—234)

The present invention relates to commutators and in particular to a process and apparatus for providing commutators with a structure which facilitates connection of armature leads to the segments of the commutator.

As is well known, it is necessary to connect leads of the armature of an electric motor to the segments of a commutator thereof at the ends of the segments which are directed toward the armature. This is conventionally done, for example, by sawing slits in these ends of the commutator segments so that the leads of the armature may be placed in these slits. However, this conventional manner of joining the armature leads to the commutator segments is extremely inconvenient because of the difficulty with which access is had to those ends of the commutator segments which are directed toward the armature and also because of the difficulty in reliably connecting the armature leads to the commutator segments in slits of the latter.

It is, accordingly, an object of the present invention to provide a process according to which a commutator may be provided with a structure which very greatly facilitates the joining of the armature leads to the commutator segments.

It is also an object of the present invention to provide a commutator structure which can have armature leads very conveniently joined thereto.

It is furthermore an object of the present invention to provide a commutator, and a process for manufacturing the same, which will assure a reliable connection of the armature leads to the commutator segments even though the armature and commutator therewith will rotate at relatively high speeds to subject the connections of the armature leads to the commutator segments to relatively high stresses, and at the same time the commutator and process for manufacturing the same, in accordance with the present invention, are extremely simple and inexpensive.

With these objects in view, the invention includes, in a process for manufacturing a commutator, the steps of raising from that end of each commutator segment to which armature leads are to be connected a tongue which extends longitudinally of the commutator segment at its outer face, placing beneath said tongue on the surface exposed by this tongue the intermediate portion of substantially U-shaped bracket, and pressing the tongue downwardly against this intermediate portion of the bracket so as to fix the latter to the commutator segment, the bracket having a pair of legs extending from its intermediate portion and directed away from the commutator axis so that armature leads may conveniently be located between these legs of the bracket to be reliably fixed to the commutator segment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
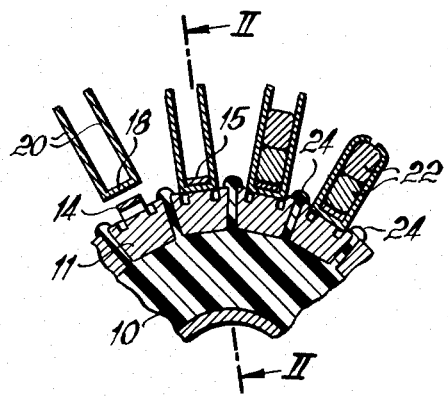
FIG. 1 is a fragmentary transverse sectional view of a commutator of the present invention, FIG. 1 illustrating different stages in the process of manufacture of the commutator and being taken along line I—I of FIG. 2 in the direction of the arrows.
Figure 2:
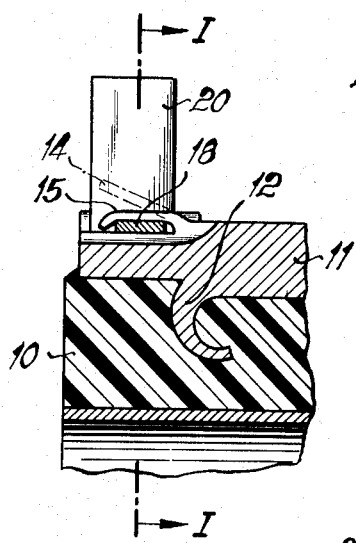
FIG. 2 is a fragmentary longitudinal sectional view of a commutator according to the invention showing the latter just before the armature leads are joined thereto, the section of FIG. 2 being taken along line II—II of FIG. 1 in the direction of the arrows.

Referring to FIGS. 1 and 2, the commutator illustrated fragmentarily therein includes a hub portion 10 of cylindrical configuration made of an electrically non-conductive material as is well known in the art, and the individual commutator segments 11 are embedded in the body of non-conductive material 10, these segments 11 of course being electrically conductive, having exposed faces which are adapted to be engaged by the brushes, and each segment 11 has a pair of anchoring claws 12, one of which is shown in FIG. 2, also embedded in the body 10 so as to provide a very secure connection of the several commutator segments 11 to the plastic body 10 of the commutator.

Figure 3:
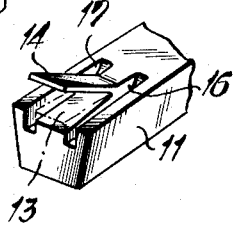
FIG. 3 is a fragmentary perspective illustration of an end of a commutator segment which is acted upon according to the process of the present invention, FIG. 3 showing this end of the commutator segment just before a bracket is joined thereto.

In accordance with the present invention, as is shown particularly in FIG. 3, a section 13, shown in dot-dash lines in FIG. 3, is raised with a suitable cutting tool from each segment 11 to form the tongue 14 shown in FIG. 3, and this tongue 14 is located at the outer surface of each segment and extends longitudinally thereof.

In order to be able to use a simple cutting tool for the purpose of raising the section 13 so as to form the tongue 14, there is first provided in each segment 11 at its outer face a pair of parallel grooves 16 and 17 which extend longitudinally of the segment 11 from one end thereof, and in this way when the cutting tool is moved from the end of segment 11 shown in FIG. 3 longitudinally of the latter the tongue 14 will precisely have a width equal to the distance between the grooves 16 and 17 and of course will have a substantially rectangular configuration. These grooves 16 and 17 can be formed, before raising of the tongue 14, by sawing.

Figure 4:
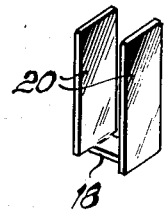
FIG. 4 is a perspective illustration of a bracket which is adapted to be joined to the commutator segment shown in FIG. 3, and the bracket shown in FIG. 4 is also shown in the assemblies of FIGS. 1 and 2.
Figures 5, 6:
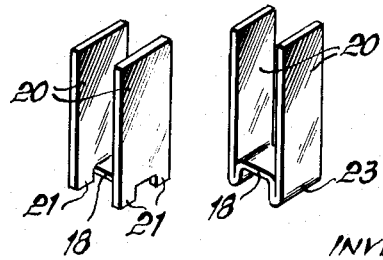
FIG. 5 is a perspective illustration of another embodiment of a bracket adapted to be used with the structure of the invention.
FIG. 6 is a perspective illustration of a still further embodiment of a bracket according to the present invention.

The tongue 14 will expose a surface of each segment 11 beneath this tongue 14, and the intermediate portion 18 of a substantially U-shaped bracket having legs 20 is placed on this exposed surface beneath the tongue 14. The width of the intermediate portion 18 of the bracket, which is of course electrically conductive, is substantially less than the length of the tongue 14. Thus, when the tongue 14 is pressed downwardly from the dot-dash line position indicated in FIG. 2 in order to form the hook-shaped fixing element 15, the intermediate portion 18 of the bracket will become fixed rigidly with the segment 11, so that in this simple way it is possible to fix a bracket as shown in FIG. 4 to each of the segments 11. The left segment 11 of FIG. 1 is shown in the condition it takes just before the intermediate portion 18 of the bracket is placed beneath the tongue 14 thereof, while the second segment from the left in FIG. 1 shows the bracket fixed to the segment with the fixing tongue 15 already formed by being pressed downwardly against the intermediate portion of the bracket. It will be noted that the pair of parallel legs of the bracket extend away from the axis of the commutator. The assembly of the brackets in the proper positions with respect to the segments is greatly facilitated by the grooves 16 and 17 which enable the brackets to be properly aligned with the segments 11. These brackets may also have the construction shown in FIGS. 5 and 6. Thus, in FIG. 5 the pair of parallel legs 20 have a pair of portions 21 respectively extending downwardly beyond the intermediate portion 18 so as to become located in the grooves 16 and 17 and in this way these grooves participate in the positioning of the brackets, while in FIG. 6 the legs 20 also have downwardly directed portions 23 which are formed simply by bending the bracket in the manner shown in FIG. 6, and these portions 23 also extend into the grooves shown in FIG. 3, these grooves 16 and 17 respectively receiving the portions 23 shown in FIG. 6. While the bracket of FIG. 6 is very simply bent from a single strip into the configuration shown in FIG. 6, the bracket of FIG. 5 is formed by slitting the portions of the bracket on the opposite sides of the intermediate part 18 thereof so as to produce the downwardly directed portions 21 when the legs 20 are bent so as to extend perpendicularly from the intermediate portion 18. These brackets serve to connect the leads of the unillustrated armature to the several commutator segments. Thus, the ends 22 of the armature leads are placed between the legs 20 of each bracket, as shown with the second segment 11 from the right in FIG. 1, and thereafter the free ends of these legs are pressed downwardly against the leads 22 in the manner shown at the right in FIG. 1 so as to fix the leads to the bracket and of course to the commutator segment. In order to reduce the resistance at the connection of the leads to the commutator segment as well as to increase the strength of this connection, the leads are joined to the bracket and commutator segment, and of course this joining may be carried out by soldering and in particular by dip-soldering with the use of a known structure for this purpose, and this arrangement is particularly suitable with the structure of the invention. Of course, soldering may also be provided at the joining of the intermediate portion 18 of each bracket to the segment 11 by the hook-shaped element 15, such soldering taking place during manufacture of the commutator. In order to prevent solder from bridging the space between a pair of adjoining commutator segments, the body 10 is formed with ribs 24 located at the exterior of the commutator between the several segments 11 thereof, as indicated in FIG. 1, and these ribs prevent the soldering material from bridging across between a pair of adjoining commutator segments 11.

It should be noted that all of the armature leads are first joined to all of the brackets and then the entire assembly of brackets and leads are dipped simultaneously into the solder solution so that the soldering of the connections of the leads to the several brackets and commutator segments takes place simultaneously for all of the brackets and all of the commutator segments, and thus a connection of low resistance is provided very quickly and easily in this way.

The commutator having the structure of the invention and formed according to the process of the invention is capable of resisting all stresses which are encountered in use of the structure and in particular will resist stresses arising from high speeds of rotation. Moreover, there is provided a very favorable flow of current from the commutator segments to the armature winding. These properties are particularly suitable for commutators of electric motors which have high current loads, such as, for example, starting motors for internal combustion engines, where the armature windings are preferably formed from wires of large cross section. The process of the invention and the commutator produced thereby prove to be particularly suitable under these conditions.

It will be understood that each of the elements described above, or two or more together, may also find a useful application in other types of commutators differing from the types described above.

While the invention has been illustrated and described as embodied in commutators and process for manufacturing the same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing a commutator, the steps of raising from the outer face of each commutator segment at an end thereof to which armature leads are to be connected a tongue attached at one end to the outer face of the commutator segment and having a free opposite end, which tongue extends longitudinally of the segment and which leaves an exposed surface beneath the raised tongue, moving under the free end of said tongue and onto the exposed surface of the segment beneath the raised tongue an intermediate portion of a substantially U-shaped bracket with a pair of legs of the bracket extending from said intermediate portion thereof and away from the segment and with the tongue extending over said intermediate portion of the bracket; and then pressing said tongue downwardly against said intermediate portion of said bracket so as to fix the latter to each segment, whereby armature leads may then be placed between the pair of legs of the bracket which is thus fixed to each segment so as to enable joining of the armature leads to the segments.

2. In a process for manufacturing a commutator, the steps of forming in each segment of a commutator at an end thereof to which armature leads are to be connected a pair of elongated grooves extending parallel to each other longitudinally of the commutator segment at the outer face thereof; raising from each segment between said grooves thereof a tongue attached at one end to the outer face of the commutator segment and having a free opposite end, which tongue leaves an exposed surface beneath said tongue; moving under the free end of said tongue and onto the exposed surface of the segment beneath the raised tongue the intermediate portion of the substantially U-shaped bracket having a pair of legs extending from said intermediate portion thereof in a direction away from the axis of the commutator with the tongue extending over said intermediate portion of the bracket; and pressing said tongue downwardly against said intermediate portion of the bracket to fix the latter to the commutator segment whereby armature leads may then be located between said legs of said bracket to be fixed by way of the latter to the commutator segment.

3. In a process for manufacturing a commutator and connecting the same electrically with an armature, the steps of raising from an end of each commutator segment a tongue attached at one end to the outer face of the commutator segment and having a free opposite end, which tongue is located at the outer face of each segment and exposes a surface beneath said tongue; moving under the free end of said tongue and onto said surface, beneath said tongue, an intermediate portion of a substantially U-shaped bracket which has a pair of legs extending from said intermediate portion and directed away from the axis of the commutator; pressing said tongue downwardly against said intermediate portion of the bracket to fix the latter to the commutator segment; placing armature leads between said legs of the bracket over said tongue; and pressing free ends of said legs against at least one of said leads to fix the latter to said bracket and armature segment.

4. In a process for manufacturing a commutator and connecting the same electrically with an armature, the steps of raising from an end of each commutator segment a tongue attached at one end to the outer face of the commutator segment and having a free opposite end, which tongue is located at the outer face of each segment and exposes a surface beneath said tongue; moving under the free end of said tongue and onto said surface, beneath said tongue, an intermediate portion of a substantially U-shaped bracket which has a pair of legs extending from said intermediate portion and directed away from the axis of the commutator; pressing said tongue downwardly against said intermediate portion of the bracket to fix the latter to the commutator segment; placing armature leads between said legs of the bracket over said tongue; pressing free ends of said legs against at least one of said leads to fix the latter to said bracket and armature segment; and soldering said leads to said bracket and segment.

5. In a commutator, in combination, a plurality of commutator segments each having at one end a tongue integral at one end thereof with the remainder of the segment and said tongue having opposite said end integral with said segment a free end; and a substantially U-shaped bracket having an intermediate portion extending beneath said tongue and held by the latter against the commutator segment so as to be fixed thereto, each bracket having a pair of legs extending from said intermediate portion thereof and directed away from the commutator axis so that armature leads may be located between said legs.

6. In a commutator, in combination, a plurality of commutator segments each having at one end a tongue integral at one end thereof with the remainder of the segment and said tongue having opposite said end integral with said segment a free end; and a substantially U-shaped bracket having an intermediate portion extending beneath said tongue and held by the latter against the commutator segment so as to be fixed thereto, each bracket having a pair of legs extending from said intermediate portion thereof and directed away from the commutator axis so that armature leads may be located between said legs, each segment being formed with a pair of elongated grooves between which said tongue thereof is located and said bracket having a pair of extensions respectively located in said grooves.

7. In a process for manufacturing a commutator, the steps of raising from the outer face of each commutator segment of a plurality of commutator segments at an end thereof to which armature leads are to be connected a tongue attached at one end to the outer face of the commutator segment and having a free opposite end, which tongue extends longitudinally of each segment and which leaves an exposed surface beneath the raised tongue; assembling said plurality of commutator segments into an annular commutator, said first two steps being carried out in any sequence; placing afterwards under the free end of said tongue and onto the exposed surface of each segment an intermediate portion of a substantially U-shaped bracket with a pair of legs of the bracket extending from said intermediate portion thereof and away from each segment and with the tongue extending over said intermediate portion of the bracket; and then pressing said tongue of each segment downwardly against the intermediate portion of the respective bracket so as to fix the latter to each segment, whereby armature leads may then be placed between the pair of legs of the bracket which is thus fixed to each segment so as to enable joining of the armature leads to the segments.

8. In a process for manufacturing a commutator, the steps of forming in each segment of a commutator at an end thereof to which armature leads are to be connected a pair of elongated grooves extending parallel to each other longitudinally from said end of the commutator segment at the outer face thereof; raising from each segment between said grooves thereof a tongue attached at one end to the outer face of the commutator segment and having a free opposite end, which leaves an exposed surface beneath said tongue; forming for each segment a U-shaped bracket having a pair of legs projecting to one side of an intermediate portion of the bracket and a pair of extensions projecting to the other side thereof; moving said intermediate portion of a bracket under the free end of said tongue and onto said exposed surface of a segment with the pair of legs of the bracket extending from said intermediate portion thereof in a direction away from the axis of the commutator, with the tongue extending over said intermediate portion of said bracket and with said pair of extensions respectively located in said grooves to thus align bracket and segment with each other; and pressing said tongue downwardly against said intermediate portion of said bracket to fix the latter to the commutator segment whereby armature leads may then be located between said legs of said bracket to be fixed by way of the latter to the commutator segment.

9. A method as set forth in claim 8 in which the segments are first assembled to a commutator before said brackets are connected thereto.

References Cited by the Examiner

UNITED STATES PATENTS 969,892   9/1910   Lord _____ 310—233

MILTON O. HIRSHFIELD, *Primary Examiner.*